(12) United States Patent
Osiecki et al.

(10) Patent No.: US 6,485,822 B1
(45) Date of Patent: Nov. 26, 2002

(54) MULTI-LAYER COMBINATION SPONGE

(75) Inventors: Scott Osiecki, Skaneateles; Steve Sieckowski, Camillus, both of NY (US); Harry J. Steele, Greenville, SC (US)

(73) Assignee: SBI, Inc., St. Louis, MO (US)

( * ) Notice: Subject to any disclaimer, the term of this patent is extended or adjusted under 35 U.S.C. 154(b) by 175 days.

(21) Appl. No.: 09/664,405

(22) Filed: Sep. 18, 2000

(51) Int. Cl.$^7$ .................................................. B32B 3/00
(52) U.S. Cl. ..................... 428/316.6; 15/118; 15/244.3; 15/244.4; 51/296; 51/298
(58) Field of Search .................. 428/316.6; 15/118, 15/244.3, 244.4; 51/296, 298

(56) References Cited

U.S. PATENT DOCUMENTS

| | | | |
|---|---|---|---|
| 2,054,198 A | 9/1936 | Jones .......................... 15/122 |
| 2,268,403 A | 12/1941 | Kingman ..................... 51/303 |
| 3,005,219 A | 10/1961 | Miller ........................... 15/98 |
| 3,377,643 A | 4/1968 | Teng et al. .................... 15/118 |
| 3,396,419 A | 8/1968 | Richter et al. ............. 15/104.93 |
| 3,428,405 A | 2/1969 | Posner ........................ 401/201 |
| 3,611,468 A | 10/1971 | Michael .................... 15/104.93 |
| 3,857,133 A | 12/1974 | Linenfelser ................... 15/118 |
| 3,861,993 A | 1/1975 | Guthrie ....................... 161/159 |
| 3,949,137 A | 4/1976 | Akrongold et al. .......... 428/311 |
| 4,111,666 A | 9/1978 | Kalbow ........................ 51/295 |
| 4,240,760 A | 12/1980 | Levine ........................ 401/201 |
| 4,820,579 A | 4/1989 | Aszman ................... 428/304.4 |
| 4,866,806 A | 9/1989 | Bedford .................... 15/104.94 |
| D353,238 S | 12/1994 | Francis ......................... D32/42 |
| D379,697 S | 6/1997 | Freudenberg et al. ......... D32/40 |
| D379,698 S | 6/1997 | Freudenberg et al. ......... D32/40 |
| 5,640,737 A | 6/1997 | Boggs .......................... 15/118 |
| 5,814,388 A | 9/1998 | Fryan ........................... 428/95 |
| 5,836,034 A | 11/1998 | Garza ........................... 15/118 |
| D410,308 S | 5/1999 | Tintelnot ..................... D32/40 |
| 2001/0029967 A1 * | 10/2001 | McDonough ................ 15/118 |

* cited by examiner

Primary Examiner—Terrel Morris
Assistant Examiner—Leanna Roché
(74) Attorney, Agent, or Firm—Thompson Coburn LLP

(57) ABSTRACT

A multi-layer combination sponge includes a scrubbing layer and a cleaning layer that are each laminated to an intermediate layer. The intermediate layer is more compressible than the cleaning layer and the scrubbing layer, and a groove is formed around a perimeter of the sponge between the cleaning layer and the scrubbing layer. The layers are preferably coextensive, forming a nose portion at the front of the combination sponge and having rounded corners at the rear of the combination sponge. The cleaning and intermediate layers each have an approximately equal thickness, and the scrubbing layer has a thickness less than one-half as thick as either the cleaning layer or the intermediate layer.

19 Claims, 3 Drawing Sheets

MULTI-LAYER COMBINATION SPONGE

CROSS-REFERENCE TO RELATED APPLICATIONS Not Applicable.

STATEMENT REGARDING FEDERALLY SPONSORED RESEARCH OR DEVELOPMENT Not Applicable.

BACKGROUND OF THE INVENTION

1. Field of the Invention

This invention relates generally to a multi-layer sponge and, more particularly, to a multilayer sponge providing increased surface conforming capabilities while maintaining preferred lathering, cleaning and scrubbing capabilities.

2. Description of Related Art

It is generally known to combine multiple layers of sponge materials, including multi-layer sponges where the exposed surface of at least one layer is used for aggressively scrubbing or scouring a working article and the exposed surface of another layer is used for less aggressive cleaning operations. Combinations of porosities, densities, and compressibilities are known to be used in these sponges. Generally, the scrubbing layer is formed with bristles or strands of fibers that are woven together or otherwise attached to a pad as in U.S. Pat. Nos. 3,428,405, 4,820,579, and 5,814,388. Alternatively, the scrubber layer may be formed from a stiff foam material that is cut into a convoluted shape as in U.S. Pat. No. 3,857,133. The cleaning layer can be used for wiping, buffing or polishing and is generally formed from an open-cell foam material, usually a polyol-based polyurethane. For the cleaning layer, it is well known to use foams that are fully or partially reticulated, and the preferred foam is generally a polyester-based polyurethane due to its increased strength and durability over a polyether-based polyurethane. The porosity of the cleaning layer is generally greater than the scrubbing layer porosity, and the prior art generally teaches decreasing porosity as the thickness of the cleaning layer increases, as in U.S. Pat. No. 3,377,643.

It is further known for some sponges to have three layers. However, none of these three-layer sponges have an internal layer that is more compressible than one external scrubbing layer and another external cleaning layer. Additionally, none of these three-layer sponges has a groove at a perimeter of the sponge to permit increased compression of the external layers at a region around the groove. Some of the known three layer sponges combine a cleanser into the sponge itself. A sponge may encase a cleanser between two layers that have identical compressibility as in U.S. Pat. No. 4,820,579. Alternatively, a layer or layers may be impregnated with a cleanser as in U.S. Pat. Nos. 3,396,419, 3,949,137, and 4,866,806. According to these known sponges, the internal layer is either too thick relative to the external layers for it to have increased compressibility or one of the external surfaces is constructed of a material that does not function as a cleaning layer or a scrubbing layer. For those three-layer sponges that do not combine a cleanser into the sponge, the internal layer is generally stiffer than the external layers, as in U.S. Pat. No. 5,640,737. In other sponges, the third layer does not affect the compressibility of the sponge, as in U.S. Pat. No. 3,857,133.

The hardness of the cleaning and scrubbing layers must be sufficient to function for their respective operations, and the requisite hardness for cleaning and scrubbing operations limits the ability of the sponge to conform to working surfaces. Some sponges have been designed with protuberances to allow better conformance of the sponge surfaces to the working surface. The protuberances may be on the side of the sponge as in U.S. Pat. Nos. 5,836,034 and 4,866,806, or the protuberances may be on the surface of the sponge as in U.S. Pat. Nos. 4,111,666 and 3,611,468. However, the prior art does not suggest providing a groove in an internal layer between the scrubbing layer and the cleaning layer to permit increased conformance of the sponge around the region of the groove. Additionally, multi-layer sponges fail to suggest using an internal layer that is more compressible than the scrubbing layer and the cleaning layer. In U.S. Pat. No. 5,640,737, an internal layer has greater porosity than the external layers to permit the absorption of more water, but the invention particularly teaches using external layers that are softer than the more abrasive internal layer; this internal layer provides additional firmness to the sponge, not increased conformability.

BRIEF SUMMARY OF THE INVENTION

It is in view of the above problems that the present invention was developed. Among the objects and features of the present invention is a multi-layer combination sponge providing an intermediate layer between a scrubbing layer and a cleaning layer; the intermediate layer having lesser hardness than the cleaning and scrubbing layers.

A second object of the present invention is to provide such a combination sponge that permits the scrubbing layer and the cleaning layer to better conform to a working surface.

A third object of the present invention is to provide such a combination sponge that conforms to a user's grasp on one surface, transitions its shape through an intermediate layer, and conforms to a working surface on an opposite surface.

In one aspect of the present invention, a combination sponge includes a scrubbing layer, an intermediate layer, and a cleaning layer. The scrubbing and cleaning layers are laminated to opposite sides of the intermediate layer. The intermediate layer is more compressible than the scrubbing layer and the cleaning layer.

In a second aspect of the present invention, a combination sponge includes a scrubbing layer, an intermediate layer, a cleaning layer, and a groove around the perimeter of the sponge. The scrubbing and cleaning layers are laminated to opposite sides of the intermediate layer. The intermediate layer is more compressible than the scrubbing layer and the cleaning layer, and the groove permits additional compression of the sponge around the region of the groove.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE INVENTION

Figure 1:
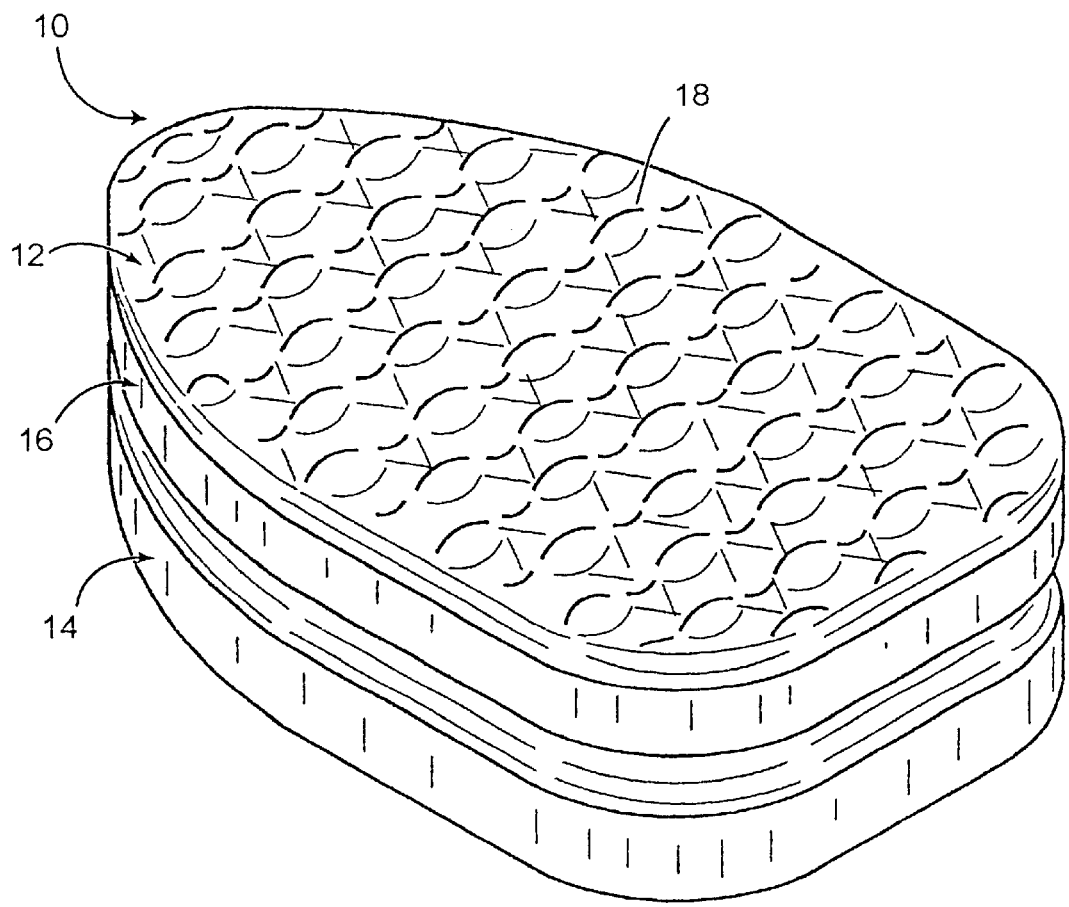
FIG. 1 illustrates a perspective view of a multi-layer combination sponge according to the present invention.
Figure 2:
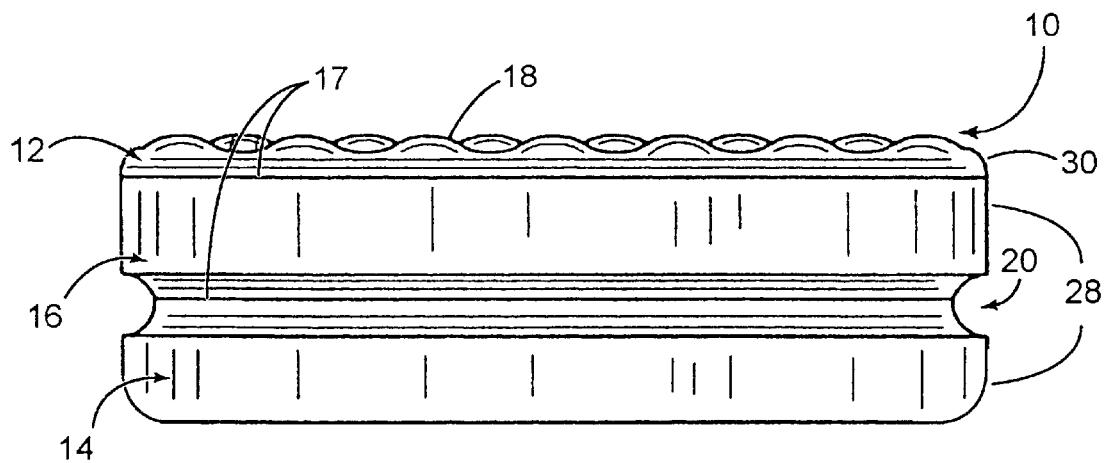
FIG. 2 illustrates a side elevational view of the combination sponge shown in FIG. 1.
Figure 3:
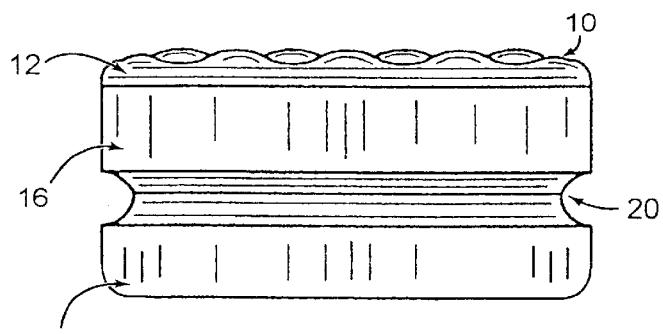
FIG. 3 illustrates a front elevational view of the combination sponge shown in FIG. 1.
Figure 4:
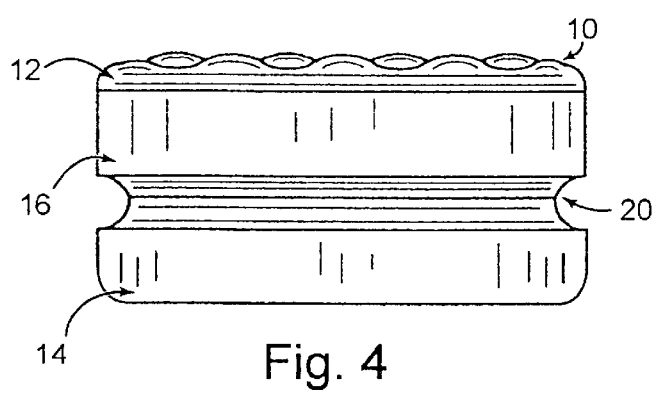
FIG. 4 illustrates a rear elevational view of the combination sponge shown in FIG. 1.

Referring to the accompanying drawings in which like reference numbers indicate like elements, FIGS. 1–5 illustrate the external features of the present invention for a multi-layer combination sponge 10. The combination sponge has a scrubbing layer 12 and a cleaning layer 14 that are laminated to an intermediate layer 16, such that the laminated layers preferably have permeable interfaces 17. The scrubbing layer preferably has a convoluted external surface 18. In the illustrated embodiment, a groove 20 is formed around a perimeter 22 of the sponge 10 between the cleaning layer 14 and the scrubbing layer 12. When the groove is formed across two layers (14, 16), it is preferably formed as illustrated, between the cleaning layer 14 and the intermediate layer 16. The layers (12, 14, 16) are preferably coextensive, forming a nose portion 24 at the front of the combination sponge and having rounded corners 26 at the rear of the combination sponge. Preferably, the cleaning and intermediate layers each have an approximately equal thickness 28, and the scrubbing layer preferably has a thickness 30 less than one-half as thick as either the cleaning layer or the intermediate layer.

Figure 6:
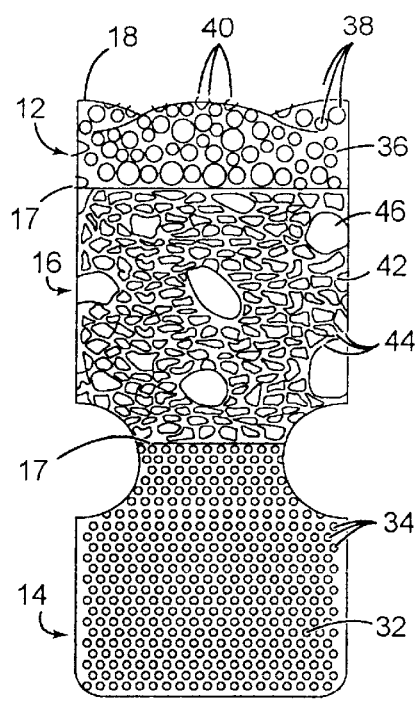
FIG. 6 illustrates an enlarged cross-sectional view taken through the nose portion of the combination sponge along the lines 6—6 of FIG. 5.
Figure 5:
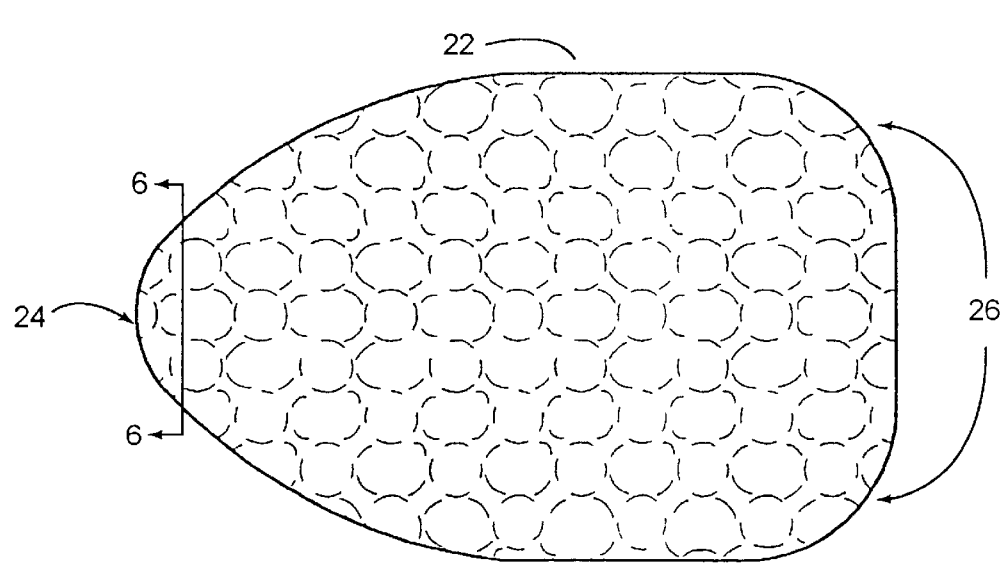
FIG. 5 illustrates a top plan view of the combination sponge shown in FIG.1.

FIG. 6 particularly illustrates the structural composition of the layers. The cleaning layer 14 is formed from a polyol-based polyurethane foam 32, preferably a polyester-based polyurethane due to its increased strength and durability over a polyether-based polyurethane. The cleaning layer has fully reticulated pores in a uniform network of substantially equilateral cells 34, such as tetrahedrons, truncated octahedrons and decahedrons. The cleaning layer preferably has a porosity greater than 60 ppi, a density between 1.7 and 2.1 pcf, and a hardness between 0.3 and 0.7 psi. The porosity of the foam, expressed in pores per inch (ppi), is a linear cell count, the number of cells measured in a linear unit of measurement. The density of the foam, expressed as pounds per cubic foot (pcf or $lb/ft^3$) is its mass per unit volume. Density is measured using the test methods of ISO 845 or ASTM D3547. The hardness of the foam is a measurement of the foam's compressibility; compressibility may be expressed as a force, such as pounds (lb), when using the Indentation Force Deflection method of ASTM D3574, or it may be expressed as a pressure, such as pounds per square inch (psi), when using the Compression Load Deflection (CLD) method of ISO 3386. As evident from the units of the cleaning layer's hardness, the CLD method is provided; the particular CLD is the pressure necessary to compress the foam to 40% of its depth. Ranges are inclusive of the upper and lower measurement boundaries.

The scrubbing layer 12 is preferably formed from a polyester foam 36 having nonreticulated, open-cell pores 38 having a porosity of less than 20 ppi, a density between 2.0 and 2.4 pcf. The scrubbing layer has a hardness greater than the cleaning layer hardness and is therefore less compressible than the cleaning layer 14. Cutting the scrubbing layer with a convoluted external surface 18 results forms a plurality of sharp, stiff edges 40 that help scour the working surface. Alternatively,the scrubbing layer may formed from a fibrous pad (not shown).

The intermediate layer 16 is formed from a polyol-based polyurethane foam 42, preferably a polyether-based polyurethane for absorption and compression qualities. The intermediate layer preferably has partially reticulated pores in a heterogenous network of irregular cells 44, a porosity between that of the cleaning layer 14 and the scrubbing layer 12, and a density less than that of the cleaning layer. The elongated cells, generally not equilateral, preferably have effective diameters 46 ranging from 0.01 to 0.125 inches. An effective cell diameter (deff) 46 can be calculated from the cube root of the cell length multiplied by the cell height by the cell depth ($d_{\mathit{eff}}=\{l*h*d\}^{1/3}$). Although the porosity and the density can vary, a hardness less than the cleaning layer hardness and the scrubbing layer hardness is important. Although the intermediate layer hardness can vary, a preferred intermediate layer hardness is less than one-third the scrubbing layer hardness even if the cleaning layer hardness is outside the preferred hardness limits set forth above.

Figure 7:
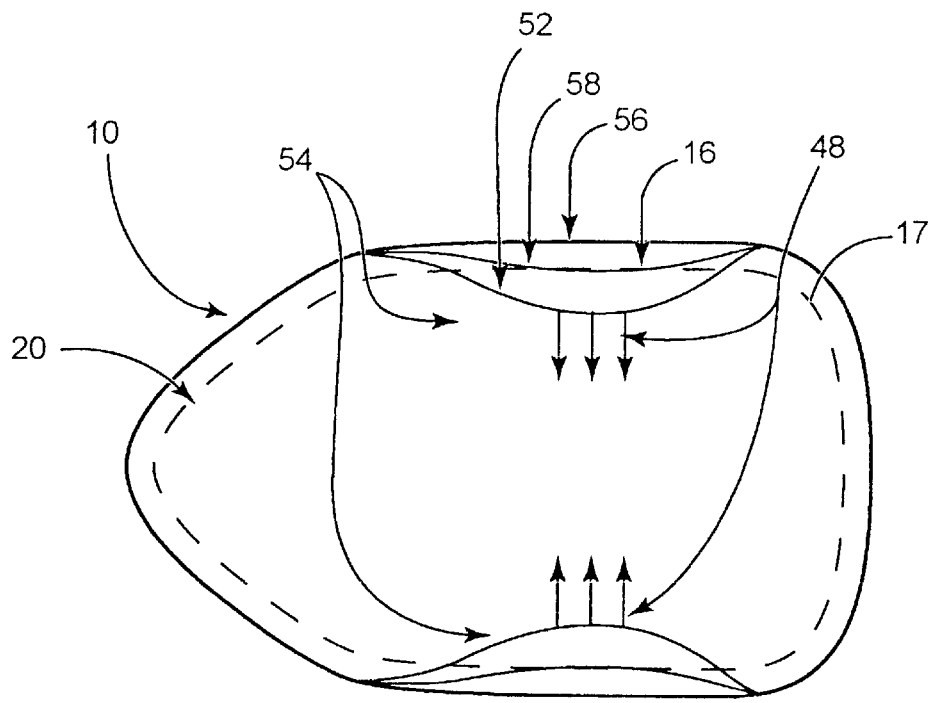
FIG. 7 illustrates plan view of the combination sponge shown in FIG. 1 under the grasping force of a user.
Figure 8:
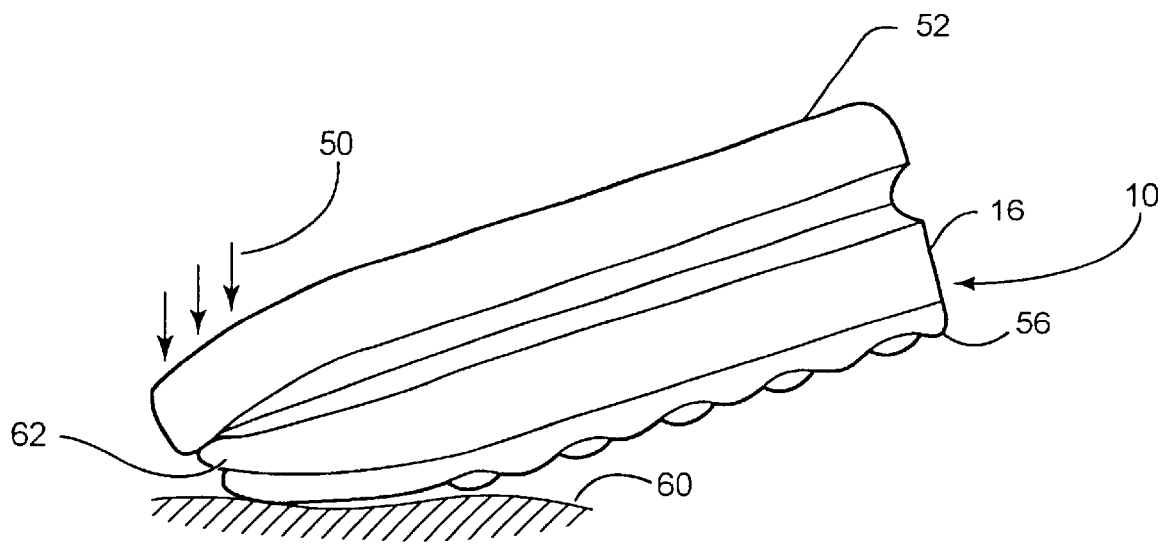
FIG. 8 illustrates a side elevational view of the combination sponge shown in FIG. 1 under the normal force of a user.

FIGS. 7 and 8 particularly illustrate the deformation of the combination sponge 10 based on a user's grasping force 48 and a user's normal force 50, respectively. When the user grasps the sponge 10 and compresses a grasped external layer 52 (either the scrubbing layer 12 or the cleaning layer 14), the sides 54 of the sponge are pulled together. Compression of the grasped external layer 52 pulls on the intermediate layer 16 through an interface 17, and the intermediate layer pulls in turn on an ungrasped external layer 56. Since the intermediate layer is more compressible than the scrubbing layer 12 and the cleaning layer 14, the intermediate layer easily deforms with the grasped external layer. According to the invention, the ungrasped external layer 52 of the sponge must be harder than the intermediate layer and therefore provides more resistance to being pulled together than does the intermediate layer. As a result, the intermediate layer provides a deformation transition region 58 between the external layers in which the cells of the foam in the intermediate layer are elongated and the ungrasped external layer substantially maintains the same shape as when the sponge is free from the grasping force. As the grasped external layer of the sponge is pulled together, the side of the groove 20 closest to the grasped external layer is pulled tight, adding even more area to the deformation transition region.

When the user applies the normal force 50 to a working surface 60 through the combination sponge 10, the relatively low hardness of the intermediate layer 16, compared with the hardness of the external layers (52, 56), causes an increased compression 62 of the intermediate layer for a given applied pressure. The increased compression of the intermediate layer permits the combination sponge (the scrubbing surface in FIG. 7) to substantially conform to the working surface an more evenly distribute the pressure through the sponge. Additionally, the nose portion of the sponge 24 and the rounded corners 26 allows the user to push the sponge into tight spaces such as wheel wells.

For cleaning a vehicle, such as a car, the preferred thickness of the sponge's combined layers is approximately 3 inches. Preferably, the approximate thickness of the scrubbing layer, intermediate layer, and cleaning layer are half an inch, one and a quarter inches, and one and a quarter inches, respectively. For a user to conveniently grasp the sponge, it is preferable that the layers are approximately six inches wide and the groove is approximately half an inch in diameter. In the preferred embodiment, the combination sponge is approximately nine inches long.

In view of the foregoing, it will be seen that the several advantages of the invention are achieved and attained. The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, the groove 20 formed between intermediate layer 16 and the cleaning layer 14 could be formed primarily or entirely in the intermediate layer, and the benefits of having a groove equally apply, allowing the scrubbing surface to conform better to highly curved working surfaces. As another example, a layer of pliant, impermeable material may be inserted between the intermediate layer 16 and the cleaning layer 14 to prevent water from flowing between the layers (14, 16) while maintaining the same flexibility. As yet another example, the combination sponge 10 can even have an entirely different plan form, being circular, elliptical, square, rectangular, triangular, or a combination of geometric shapes. Thus, the breadth and scope of the present invention should not be limited by any of the above-described exemplary embodiments, but should be defined only in accordance with the following claims appended hereto and their equivalents.

What is claimed is:

1. A multi-layer combination sponge, comprising:
   a cleaning layer of polyester-based polyurethane foam having fully reticulated pores in a uniform network of substantially equilateral cells, the cleaning layer also having a porosity greater than 60 ppi, a density between 1.7 and 2.1 pcf, and a hardness between 0.3 and 0.7 psi;
   a scrubbing layer of polyester foam having non-reticulated, open-cell pores with a porosity of less than 20 ppi, a density between 2.0 and 2.4 pcf, and a hardness greater than the cleaning layer hardness; and
   an intermediate layer of polyether-based polyurethane foam having partially reticulated pores in a heterogenous network of irregular cells, a porosity between the cleaning layer porosity and the scrubbing layer porosity, a density less than the cleaning layer density, and a hardness less than the cleaning layer hardness, the intermediate layer also having a first side attached to the cleaning layer and a second side attached to the scrubbing layer such that fluid can travel between the cleaning layer and the scrubbing layer.

2. A sponge according to claim 1 wherein the heterogenous network of cells is comprised of a plurality of individual cells having effective diameters ranging from 0.01 to 0.125 inches.

3. A sponge according to claim 1 wherein the scrubbing layer has a convoluted external surface.

4. A sponge according to claim 1 wherein the scrubbing layer has a hardness greater than 0.7 psi.

5. A sponge according to claim 1 wherein the intermediate layer has a hardness less than 0.3 psi.

6. A sponge according to claim 1 wherein the cleaning layer, the intermediate layer, and the scrubbing layer are coextensive, the cleaning layer and the intermediate layer each having an approximately equal thickness and the scrubbing layer having a thickness less than one-half as thick as the equal thickness.

7. A sponge according to claim 1 further comprising a groove formed between the cleaning layer and the intermediate layer.

8. A sponge according to claim 1 further comprising a groove defining a perimeter around said sponge, the groove disposed between the cleaning layer and the intermediate layer.

9. A multi-layer combination sponge, comprising:
   a cleaning layer of open-cell, polyol-based polyurethane foam having a hardness;
   a scrubbing layer having a hardness greater than the hardness of the cleaning layer;
   an intermediate layer of polyol-based polyurethane foam having a first side attached to the cleaning layer and having a second side attached to the scrubbing layer, the intermediate layer of foam having a hardness less than the cleaning layer hardness; and
   a groove formed between the cleaning layer and the intermediate layer.

10. A sponge according to claim 9 having a rounded nose portion.

11. A sponge according to claim 10 wherein the groove is formed at the rounded nose portion.

12. A sponge according to claim 9 wherein the groove is formed around a perimeter of the sponge.

13. A sponge according to claim 9 wherein the groove is partially formed within the intermediate layer.

14. A sponge according to claim 9 wherein the scrubbing layer has a hardness at least three times greater than the hardness of the intermediate layer.

15. A sponge according to claim 14 wherein the intermediate layer is a polyether-based polyurethane foam.

16. A sponge according to claim 9 wherein the cleaning layer has fully reticulated pores in a uniform network of substantially equilateral cells, the cleaning layer also having a porosity greater than 60 ppi, a density between 1.7 and 2.1 pcf, and a hardness between 0.3 and 0.7 psi.

17. A sponge according to claim 16 wherein the scrubbing layer is a polyester foam having non-reticulated, open-cell pores with a porosity of less than 20 ppi and a density between 2.0 and 2.4 pcf.

18. A sponge according to claim 17 wherein the intermediate layer is a polyether-based polyurethane foam having a porosity between the porosity of the cleaning layer and the porosity of the scrubbing layer, a density less than the density of the cleaning layer, and a hardness less than the hardness of the cleaning layer.

19. A sponge according to claim 9 wherein the scrubbing layer is a fibrous pad.

* * * * *